(12) United States Patent
Tanaka

(10) Patent No.: US 10,203,593 B2
(45) Date of Patent: Feb. 12, 2019

(54) LIGHT SOURCE DEVICE HAVING A RETARDATION PLATE AND PROJECTION DISPLAY APPARATUS INCLUDING THE LIGHT SOURCE

(71) Applicant: Panasonic Intellectual Property Management Co., Ltd., Osaka (JP)

(72) Inventor: Takaaki Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/806,079

(22) Filed: Nov. 7, 2017

(65) Prior Publication Data

US 2018/0217486 A1 Aug. 2, 2018

(30) Foreign Application Priority Data

Jan. 27, 2017 (JP) .................................. 2017-012692
Sep. 25, 2017 (JP) .................................. 2017-183137

(51) Int. Cl.
*G03B 21/20* (2006.01)
*G02B 27/14* (2006.01)
(Continued)

(52) U.S. Cl.
CPC ....... *G03B 21/2073* (2013.01); *G02B 27/141* (2013.01); *G02B 27/283* (2013.01); *G02B 27/286* (2013.01); *G03B 21/005* (2013.01); *G03B 21/16* (2013.01); *G03B 21/204* (2013.01); *G03B 21/208* (2013.01);
(Continued)

(58) Field of Classification Search
CPC .............. G03B 21/2033; G03B 21/204; G03B 21/2013; G03B 21/2066; G03B 21/2073; G03B 21/208

See application file for complete search history.

(56) References Cited

U.S. PATENT DOCUMENTS 6,993,059 B2 * 1/2006 Anikitchev ........ G02B 27/0977
372/100
7,006,549 B2 * 2/2006 Anikitchev ............ G02B 27/09
372/107
(Continued)

FOREIGN PATENT DOCUMENTS

JP 2012-018208 1/2012
JP 2012-137744 7/2012

*Primary Examiner* — Bao-Luan Q Le
(74) *Attorney, Agent, or Firm* — Wenderoth, Lind & Ponack, L.L.P.

(57) ABSTRACT

A light source device according to the present disclosure includes: a plurality of solid-state light source units; a polarization combination mirror for combining polarized lights incident from the plurality of the solid-state light source units; a half-wavelength plate having a strip shape, for converting a polarization azimuth of one of polarized lights coming from the polarization combination mirror; another half-wavelength plate for controlling proportions of intensities of polarization components of the polarized lights incident from the former half-wavelength plate; a dichroic mirror for separating the polarized lights incident from the latter half-wavelength plate; a phosphor plate for emitting light, upon being excited by the polarized light having been separated by the dichroic mirror.

16 Claims, 6 Drawing Sheets

(51) Int. Cl.
*G03B 21/16* (2006.01)
*G03B 21/00* (2006.01)
*G03B 21/28* (2006.01)
*G02B 27/28* (2006.01)
*G02B 5/30* (2006.01)
*G02B 26/00* (2006.01)

(52) U.S. Cl.
CPC ..... *G03B 21/2013* (2013.01); *G03B 21/2066* (2013.01); *G03B 21/28* (2013.01); *G02B 5/3083* (2013.01); *G02B 26/008* (2013.01)

(56) References Cited

U.S. PATENT DOCUMENTS

| | | | | |
|---|---|---|---|---|
| 7,010,194 | B2* | 3/2006 | Anikitchev | G02B 6/4206 385/33 |
| 8,690,343 | B2* | 4/2014 | Tanaka | G03B 21/2013 348/743 |
| 8,733,940 | B2* | 5/2014 | Tanaka | G03B 21/28 353/20 |
| 9,500,937 | B2* | 11/2016 | Tanaka | G03B 21/204 |
| 9,645,481 | B2* | 5/2017 | Tanaka | G02B 26/007 |
| 2004/0067016 | A1* | 4/2004 | Anikitchev | G02B 6/4206 385/34 |
| 2004/0252743 | A1* | 12/2004 | Anikitchev | G02B 27/09 372/97 |
| 2004/0252744 | A1* | 12/2004 | Anikitchev | G02B 27/0977 372/100 |
| 2011/0261174 | A1* | 10/2011 | Silverstein | G03B 35/26 348/58 |
| 2012/0008098 | A1 | 1/2012 | Akiyama | |
| 2012/0133903 | A1* | 5/2012 | Tanaka | G03B 21/2013 353/31 |
| 2012/0140183 | A1* | 6/2012 | Tanaka | G03B 21/28 353/20 |
| 2012/0268917 | A1* | 10/2012 | Kitano | H04N 9/3105 362/84 |
| 2013/0135727 | A1* | 5/2013 | Takada | G02B 5/3083 359/489.07 |
| 2014/0293232 | A1* | 10/2014 | Tanaka | G03B 21/204 353/20 |
| 2015/0049307 | A1* | 2/2015 | Kashihara | G02B 27/1046 353/20 |
| 2016/0077416 | A1* | 3/2016 | Liu | G03B 21/208 362/19 |
| 2016/0238923 | A1* | 8/2016 | Tanaka | G02B 26/007 |

* cited by examiner

LIGHT SOURCE DEVICE HAVING A RETARDATION PLATE AND PROJECTION DISPLAY APPARATUS INCLUDING THE LIGHT SOURCE

BACKGROUND

1. Technical Field

The present disclosure relates to light source devices, and to projection display apparatuses in each of which images formed on small-sized light valves are irradiated with illumination light, with the images being enlarged and projected on a screen via a projection lens.

2. Description of the Related Art

In recent years, a large number of light source devices configured with solid-state light sources have been used as light sources for projection display apparatuses each of which uses light valves such as mirror-deflection-type digital micromirror devices (DMDs) or liquid crystal panels. Such solid-state light sources include a semiconductor laser and a light-emitting diode, featuring long service life. Among the light source devices is a light source device that is disclosed in Japanese Patent Unexamined Publication No. 2012-137744. The disclosed light source device utilizes polarization characteristics of light exiting from a solid-state light source, thereby allowing the device to be compact and capable of efficiently condensing the light exiting from the solid-state light source. Moreover, Japanese Patent Unexamined Publication No. 2012-18208 discloses a light source device that adopts mirrors to efficiently combine light coming from a plurality of solid-state light source units. Such mirrors include: a polarization combination mirror, and a mirror that is provided with reflection regions and transmission regions for spatially combining the light.

SUMMARY

A light source device according to the present disclosure includes: a plurality of solid-state light source units, a polarization combination mirror, a first retardation plate, a dichroic mirror, a phosphor plate, a second retardation plate, a reflecting plate, and a third retardation plate. The plurality of the solid-state light source units includes: a plurality of solid-state light sources, and a plurality of lenses. The polarization combination mirror combines polarized lights incident from the solid-state light source units. The first retardation plate converts polarization states of the polarized lights coming from the polarization combination mirror. The dichroic mirror separates the polarized lights coming from the solid-state light source units via the first retardation plate, and combines blue color light and green-and-red color light. The phosphor plate is excited by one of the polarized lights to emit fluorescence having green and red components, with the polarized lights having been separated by the dichroic mirror. The second retardation plate converts the other of the polarized lights to a circularly-polarized light, with the polarized lights having been separated by the dichroic mirror.

In accordance with the technology according to the resent disclosure, the retardation plate having the strip shape is disposed posterior to the polarization combination mirror that combines the polarized lights coming from the plurality of the solid-state light source units. This makes it possible to efficiently separate and condense the lights coming from the solid-state light sources, and to efficiently combine fluorescence and the light coming from the solid-state light sources. With this configuration, it is possible to configure the light source device featuring a compact size and high luminance; therefore, this can provide a projection display apparatus featuring long service life and high luminance.

DETAILED DESCRIPTION

Hereinafter, embodiments according to the present disclosure will be described with reference to the accompanying drawings.

First Exemplary Embodiment

Figure 1:
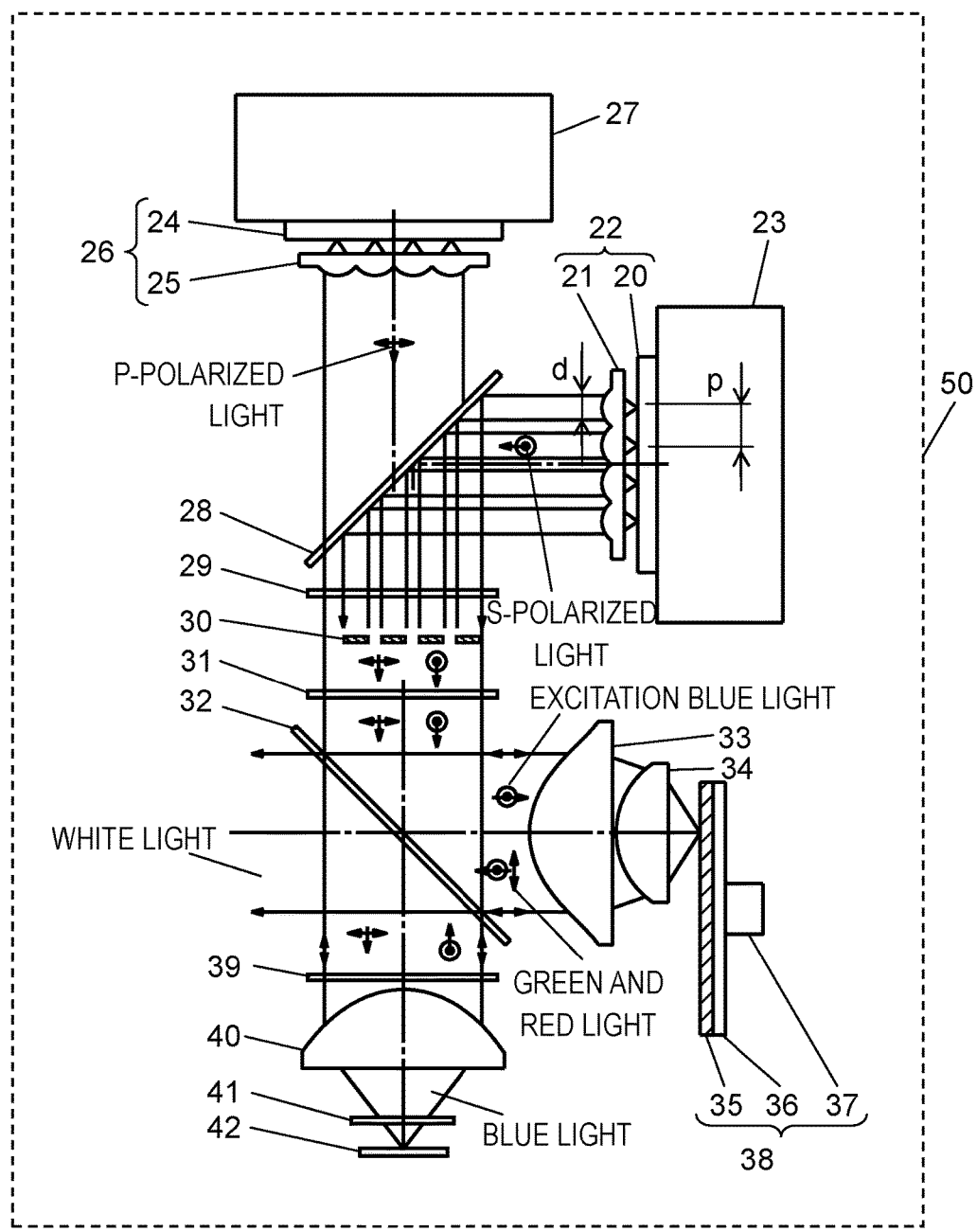
FIG. 1 is a view of a configuration of a light source device according to a first embodiment of the present disclosure.

FIG. 1 is a view of a configuration of a light source device according to an embodiment of the present disclosure. Note that, FIG. 1 shows a modality of each of luminous fluxes exiting from solid-state light sources 20 and 24, polarization directions of light incident on polarization combination mirror 28 and dichroic mirror 32, and polarization directions of light exiting from polarization combination mirror 28 and dichroic mirror 32.

Light source device 50 includes: first solid-state light source unit 22, second solid-state light source unit 26, polarization combination mirror 28, first diffusing plate 29, a plurality of half-wavelength plates 30 serving as a third retardation plate, half-wavelength plate 31 serving as a first retardation plate, dichroic mirror 32, condensing lenses 33 and 34, phosphor plate 38, quarter-wavelength plate 39 serving as a second retardation plate, condensing lens 40, second diffusing plate 41, and reflecting plate 42.

First solid-state light source unit 22 is configured with a plurality of collimator lenses 21 and solid-state light source 20 in which a plurality of semiconductor lasers is disposed; heat dissipating plate 23 is fitted to the first solid-state light source unit. Each of the plurality of the semiconductor lasers, which configures solid-state light source 20, is one example of a first solid-state light source element.

Second solid-state light source unit 26 is configured with a plurality of collimator lenses 25 and solid-state light source 24 in which a plurality of semiconductor lasers is disposed; heat dissipating plate 27 is fitted to the second solid-state light source unit. Each of the plurality of the semiconductor lasers, which configures solid-state light source 24, is one example of a second solid-state light source element.

In each of solid-state light sources 20 and 24, 20 pieces (4×5) of the semiconductor lasers are arranged at a pitch of "p" in a two-dimensional rectangle array. The semiconductor lasers of solid-state light sources 20 and 24 emit blue light, in a wavelength range from 447 nm to 462 nm, which is a linearly-polarized light. Solid-state light sources 20 and 24 are disposed such that light emitted from the sources are an s-polarized light and a p-polarized light, respectively, with respect to the corresponding plane of incidence of polarization combination mirror 28.

The pluralities of collimator lenses 21 and 25 are disposed such that each of the collimator lenses condenses the light emitted from the corresponding semiconductor laser of solid-state light sources 20 and 24, with the light being converted to form a group of parallel luminous fluxes. Let "d" be the width of the parallel luminous flux exiting from each of the collimator lens. That is, collimator lenses 21 and 25 cause the light to exit as the parallel luminous fluxes with luminous flux widths "d," with the light having exited from each of solid-state light sources 20 and 24, respectively. Each of collimator lens 21 is one example of a first lens; each of collimator lens 25 is one example of a second lens. Heat dissipating plates 23 and 27 are intended to cool solid-state light sources 20 and 24. In this way, first solid-state light source unit 22 emits the s-polarized light; second solid-state light source unit 26 emits the p-polarized light. Here, the s-polarized light is one example of a first linearly-polarized light; the p-polarized light is one example of a second linearly-polarized light. The first linearly-polarized light and the second linearly-polarized light are perpendicular to each other.

Moreover, second solid-state light source unit 26 is disposed, being displaced by p/2 relative to first solid-state light source unit 22, in a direction parallel to the p-polarization direction. First solid-state light source unit 22 and second solid-state light source unit 26 are each a small-sized solid-state light source unit in which semiconductor lasers are arranged at a small pitch of "p," with luminous flux widths "d" being each larger than p/2. The s-polarized light exiting from first solid-state light source unit 22 and the p-polarized light exiting from second solid-state light source unit 26, are combined together after they enter polarization combination mirror 28.

Figure 2:
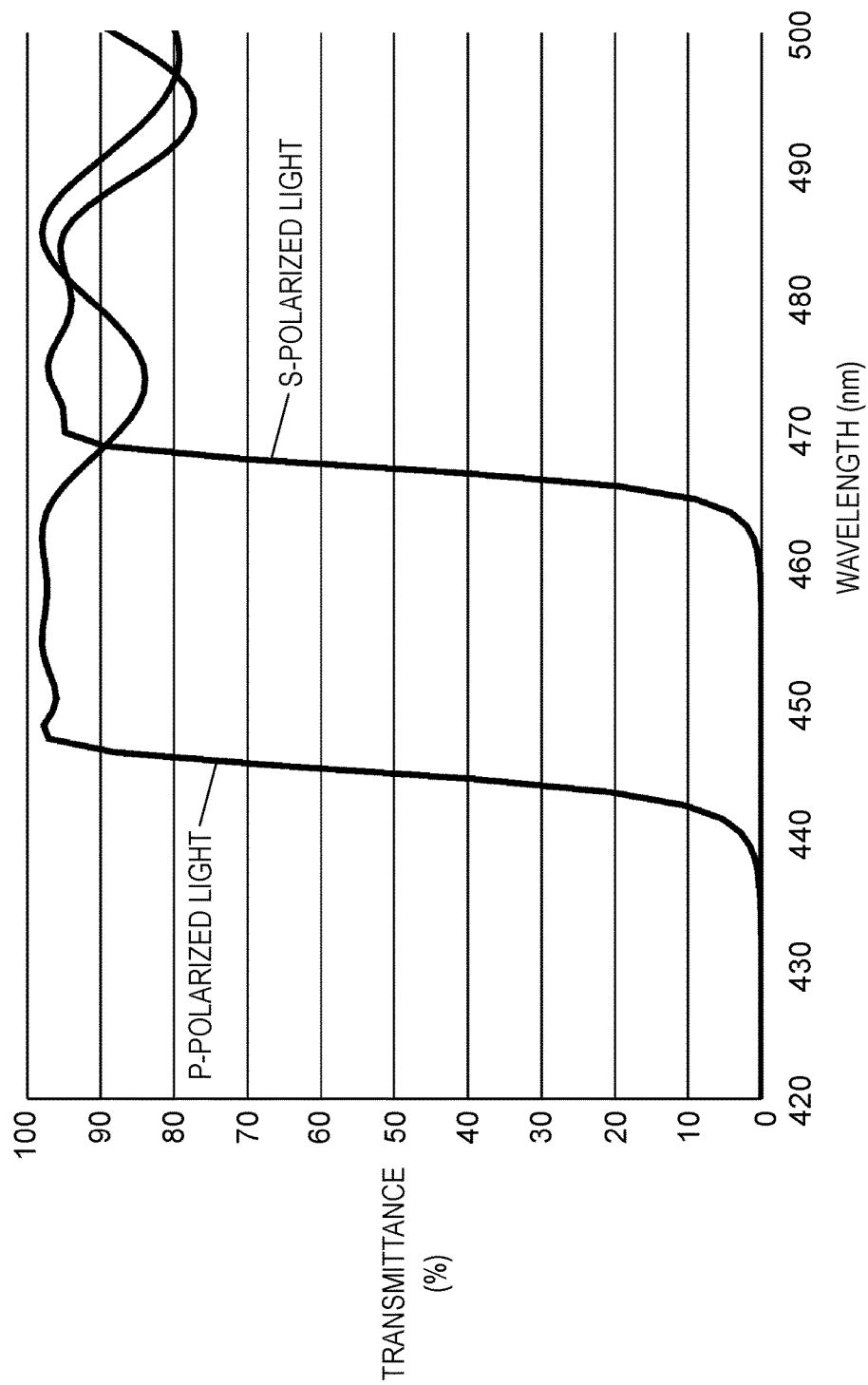
FIG. 2 is a graph of spectral transmittance characteristics of a polarization combination mirror.

FIG. 2 is a graph of spectral transmittance characteristics of polarization combination mirror 28.

As shown in FIG. 2, polarization combination mirror 28 transmits not smaller than 96% of a p-polarized light and reflects not smaller than 98% of an s-polarized light, in a wavelength range from 447 nm to 462 nm. When d>p/2 where "d" is the luminous flux width of luminous fluxes exiting from first solid-state light source unit 22 and second solid-state light source unit 26, the luminous flux exiting from first solid-state light source unit 22 is reflected and the luminous flux exiting from second solid-state light source unit 26 is transmitted. For this reason, with a mirror for spatially combining light, it is difficult to efficiently combine the s-polarized light exiting from first solid-state light source unit 22 and the p-polarized light exiting from second solid-state light source unit 26. Fortunately, use of polarization combination mirror 28 according to the embodiment makes it possible to efficiently combine the light, because it is achieved through not spatial combining but polarization combining. The light highly-efficiently combined enters first diffusing plate 29.

First diffusing plate 29 is made of glass, having either fine concave-and-convex structures processed in the surface of the plate or fine lenses formed on the surface of the plate, which thereby diffuses light. The diffusion angle is so small, approximately 4 (four) degrees, that the polarization characteristics of the light are held; the diffusion angle is a half-value angle width referring to an angle at which the diffused light decreases in intensity to 50% of its maximum. The light having passed through first diffusing plate 29 enters half-wavelength plate 30 that configures the third retardation plate. Half-wavelength plate 30 is a retardation plate with which the phase difference becomes a ½ wavelength, in the vicinity of a dominant wavelength of the light emitted by solid-state light source 20. Half-wavelength plate 30 is a strip shaped plate, and configures a plurality of the half-wavelength plates which is disposed such that it will convert all the s-polarized luminous fluxes emitted from first solid-state light source unit 22 into p-polarized luminous fluxes. Such strip shaped half-wavelength plates each have strip width "d" equal to luminous flux width "d," and are disposed at predetermined regular intervals that are each smaller than luminous flux width "d." In the embodiment, four pieces of half-wavelength plates 30 are disposed such that each of the half-wavelength plates is irradiated with the corresponding luminous flux of the s-polarized light coming from solid-state light source 20, with the luminous flux being superimposed on the strip width of the third retardation plate. Each of half-wavelength plates 30 is disposed such that, assuming that the p-polarization direction shown in FIG. 1 is 0 (zero) degree, then the optical axis of the half-wavelength plate is at 45 degrees. Note that, in the embodiment, four pieces of half-wavelength plates 30 are disposed; however, at least one half-wavelength plate may be disposed.

When luminous flux width d<p/2, the p-polarized light coming from second solid-state light source unit 26 is not converted to an s-polarized light; however, when luminous flux width d>p/2, a part of the luminous fluxes is converted to an s-polarized light. FIG. 1 in the embodiment shows the case where luminous flux width d>p/2. Therefore, the light having passed through half-wavelength plates 30 becomes a mixed light in which the s-polarized light is partially mixed to the major p-polarized light.

Figure 3:
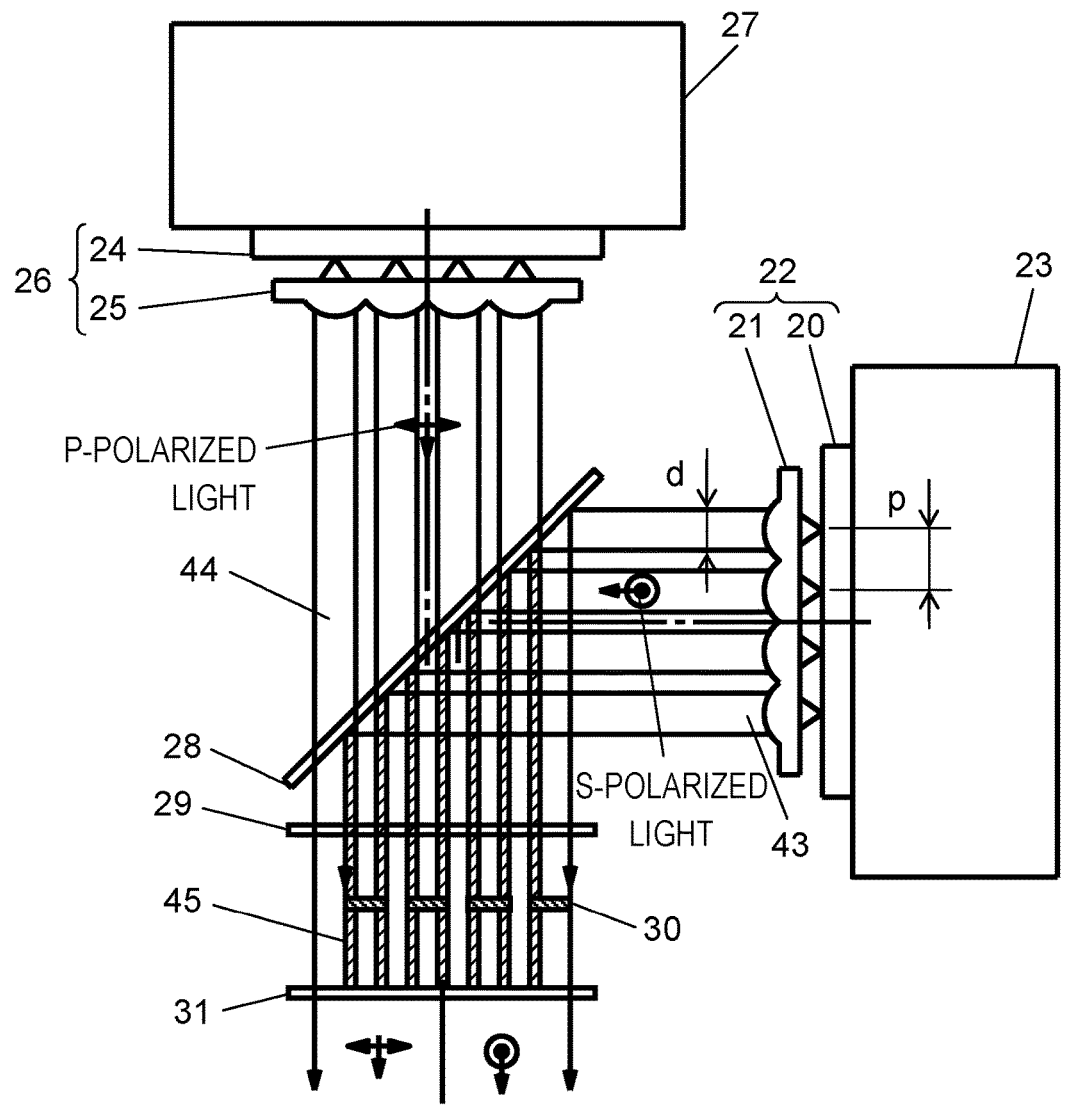
FIG. 3 is a view of an optical configuration of the light source device, from solid-state light sources to a first retardation plate, according to the present disclosure.

FIG. 3 is a view of an optical configuration, from the solid-state light sources to half-wavelength plate 31 serving as the first retardation plate.

In FIG. 3, each of the hatched areas indicates a part of the luminous flux that has been combined together by polarization combination mirror 28, with the part containing the light of mixed polarization. For example, each of luminous fluxes 43 incident from first solid-state light source unit 22 and corresponding one of luminous fluxes 44 incident from second solid-state light source unit 26, are combined together by polarization combination mirror 28 to form luminous flux 45 with mixed polarizations, followed by entering half-wavelength plate 30. With half-wavelength plate 30, the s-polarized light of luminous flux 45 is converted to a p-polarized light while the p-polarized light of the luminous flux is converted to an s-polarized light.

The light having passed through half-wavelength plate 30 enters half-wavelength plate 31 serving as the first retardation plate. Half-wavelength plate 31 is disposed such that, assuming that the p-polarization direction shown in FIG. 3 is 0 (zero) degree, then the optical axis of the half-wavelength plate is at 32.5 degrees. When the optical axis is at 32.5 degrees, half-wavelength plate 31 converts the polarization azimuth of the p-polarization into 65 degrees, with light intensities of the p-polarization and s-polarization components becoming 18% and 82%, respectively, thereby achieving a desired white light chromaticity. Half-wavelength plate 31 is provided with a rotation adjusting mechanism, thereby allowing adjustment of the alignment angle of the optical axis of the plate. With this configuration, even in the case where luminous flux width d>p/2 with the s-polarized light being partially mixed to, the optical axis can be adjusted within an angular range from 32.5 degrees to 0 (zero) degree, as long as the s-polarization component is not larger than 18%. Within the angular range, the adjustment does not change the polarization azimuth. As a result, when being converted, the light intensities of the p-polarization and s-polarization components can be adjusted to 18% and 82%, respectively. In this way, the light can be adjusted, so that the light intensity of the p-polarization component is 18% while the light intensity of the s-polarization component is 82% with the light having exiting from half-wavelength plate 31.

Each of half-wavelength plates 30 and 31 and quarter-wavelength plate 39 shown in FIG. 1 is a thin-film retardation plate which functions through birefringence that is achieved by forming a film with a dielectric material by oblique deposition. Such a thin-film retardation plate is composed of an inorganic material, featuring excellent durability and reliability as in the case of inorganic optical crystals such as quartz, and having an advantage of being relatively cheap over quartz.

The light having exited from half-wavelength plate 31 serving as the first retardation plate, enters dichroic mirror 32.

Figure 4:
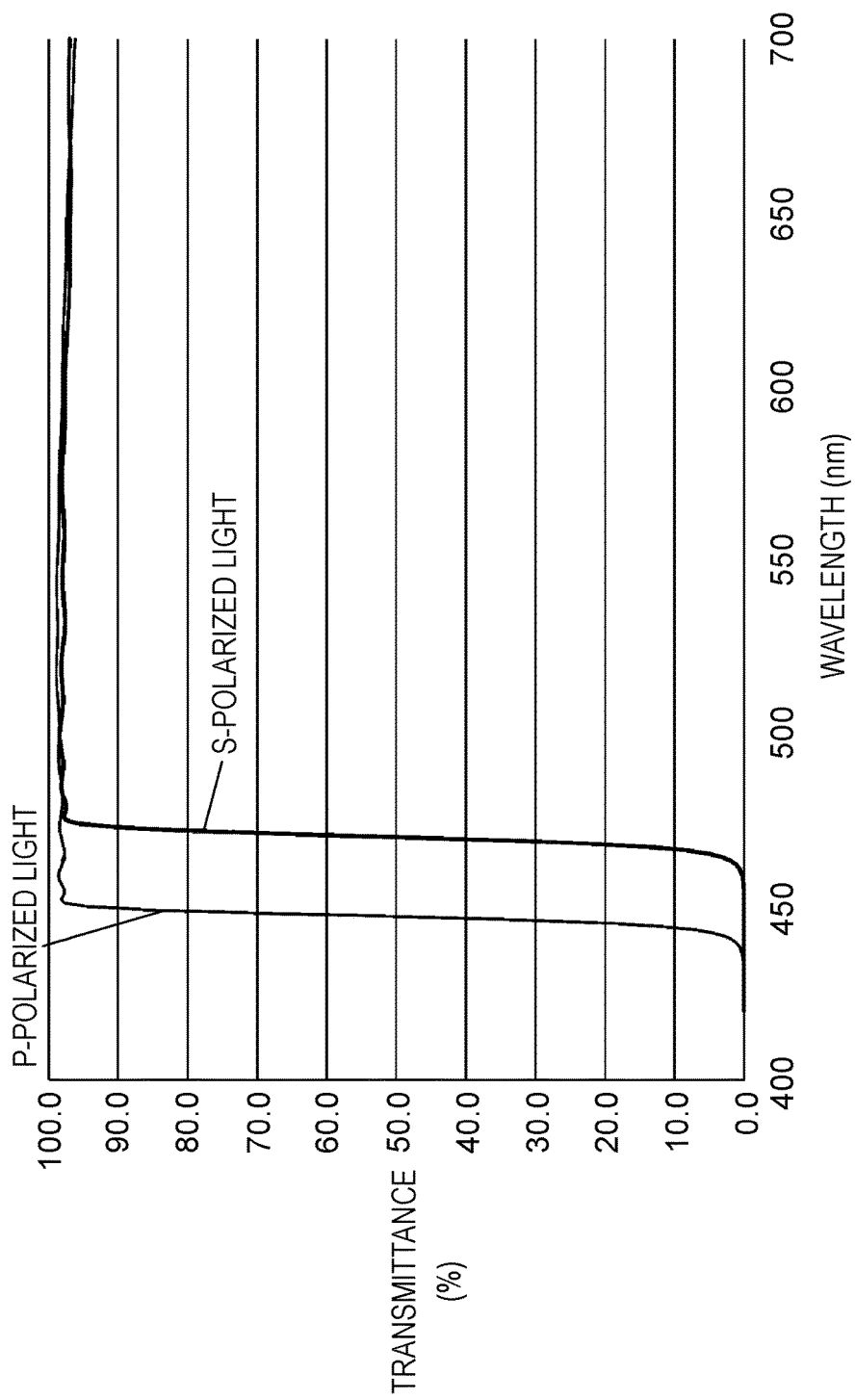
FIG. 4 is a graph of spectral transmittance characteristics of a dichroic mirror.

FIG. 4 is a graph of spectral transmittance characteristics of the dichroic mirror.

As shown in FIG. 4, the characteristics show that blue light is transmitted and reflected such that the wavelength with which the transmittance becomes 50% is 465 nm for an s-polarized light and 442 nm for a p-polarized light. With the characteristics, color light containing green and red components is transmitted by not smaller than 96%. Of the light incident on dichroic mirror 32, the s-polarization component is reflected while the p-polarization component is transmitted. Half-wavelength plate 31 transmits and reflects the s-polarization and p-polarization components, respectively, so that the light intensities of the s-polarization and p-polarization components become 82% and 18%, respectively.

The s-polarized blue light of 82% light intensity that has been reflected off dichroic mirror 32 is then condensed by condensing lenses 33 and 34. Assuming that the terms "spot diameter of a spot light" are defined as a diameter with which the light intensity becomes 13.5% of the peak intensity, then the s-polarized blue light of 82% light intensity is superimposed to form a spot light with a spot diameter of 1.5 mm to 2.5 mm, and is allowed to enter phosphor plate 38. The spot light is adjusted to have a desired spot diameter through use of first diffusing plate 29 that diffuses the light when passing through it.

Phosphor plate 38 is configured, including a reflection film, aluminum substrate 36 on which phosphor layer 35 is formed, and motor 37 disposed at a central portion of the plate. Phosphor plate 38 is a circular substrate rotation-controllable. The reflection film of phosphor plate 38 is either a metal film or dielectric film to reflect visible light, which is formed on the aluminum substrate. Moreover, on the reflection film, phosphor layer 35 is formed. In phosphor layer 35, there is formed a cerium (Ce)-activated yttrium-aluminum-garnet (YAG) yellow phosphor which is excited by blue light to emit yellow light containing green and red components. A typical chemical composition of the crystalline matrix of the phosphor is $Y_3Al_5O_{12}$. Phosphor layer 35 is formed in an annular shape. Upon excited by the spot light, phosphor layer 35 emits the yellow light containing the green and red components. Phosphor plate 38, being formed on the aluminum substrate, is rotated to reduce a temperature rise of phosphor layer 35 caused by the excitation light, thereby stably keeping its fluorescence conversion efficiency. The light incident on phosphor layer 35 causes the phosphor to emit the color light having the green and red components, with the color light exiting from phosphor plate 38. Moreover, light emitted toward the reflection film side is reflected off the reflection film to exit from phosphor plate 38. The green and red color light having exited from phosphor plate 38 are natural light; they are condensed again by condensing lenses 33 and 34 to be converted into a substantially parallel light, and then allowed to pass through dichroic mirror 32.

On the other hand, the p-polarized blue light of 18% light intensity that has passed through dichroic mirror 32 enters quarter-wavelength plate 39 serving as the second retardation plate. Quarter-wavelength plate 39 is a retardation plate with which the phase difference becomes a ¼ wavelength, in the vicinity of a dominant wavelength of the light emitted by the semiconductor lasers. Quarter-wavelength plate 39 is disposed such that, assuming that the p-polarization direction shown in FIG. 3 is 0 (zero) degree, then the optical axis of the quarter-wavelength plate is at 45 degrees. The light is converted into a circularly-polarized light when passing through quarter-wavelength plate 39, and then enters condensing lens 40 so as to be condensed. Condensing lens 40 is configured to have a focal length that provides the converging angle of the condensed light being not larger than 40 degrees, which thereby allows the formation of a condensed spot light in the vicinity of reflecting plate 42. The light having been condensed by condensing lens 40 enters second diffusing plate 41. Second diffusing plate 41 diffuses the light incident thereon, thereby eliminating speckles of the laser-emitted light as well as making the light intensity distribution uniform. Second diffusing plate 41 is configured with a thin glass plate, the surface of which has either fine concave-and-convex structures or fine lenses, thereby diffusing the light. Second diffusing plate 41 provides a diffusion angle of approximately 4 (four) degrees to the light that passes, one time, through the diffusion surface of the diffusion plate, with the polarization characteristics being held. The circularly-polarized light having passed through second diffusing plate 41 is reversed in phase by reflecting plate 42, thereby becoming a circularly-polarized light with the reversed rotation direction. The reflecting plate is provided with a reflection film such as an aluminum film or dielectric multilayer film which is formed on the plate. The light having been reflected off reflecting plate 42 is diffused again by second diffusing plate 41. After that, the light is converted into a parallel light by condensing lens 40, and then allowed to enter quarter-wavelength plate 39. The reversed-rotation circularly-polarized light having entered quarter-wavelength plate 39 is converted into an s-polarized light, followed by being reflected off dichroic mirror 32.

In this way, the fluorescence emitted from phosphor plate 38 and the blue light having been subjected to efficient polarization conversion, are combined together by dichroic mirror 32 to exit as white light. Use of the yellow light containing fluorescence with green and red components and the blue light emitted by semiconductor lasers, provides luminescence emission characteristics of an excellent white balance. The luminescence emission spectrum characteristics can provide monochromatic lights having desired chromaticity coordinates, even in a case where the white light is separated into the three primary colors, i.e. blue, green, and red colors, by using the optical system of a projection display apparatus.

Half-wavelength plate 30 serving as the third retardation plate is disposed at the position such that the s-polarized light emitted from the first solid-state light source unit is converted into the p-polarized light; however, the half-wavelength plate may be disposed at a position such that the p-polarized light emitted from the second solid-state light source unit is converted into an s-polarized light. In this case, the resulting luminous flux is a mixed flux in which the p-polarized light is partially mixed to the major s-polarized light. Therefore, it is required to change the optical axis of the first retardation plate to be at an appropriate angle such that the first retardation plate causes the light to exit therefrom, with the light intensity of the p-polarization component being 18% while the light intensity of the s-polarization component being 82%.

Moreover, in this case where the third retardation plate is disposed at the position such that the p-polarized light emitted from the second solid-state light source unit is converted into the s-polarized light, a major part of the light entering the first retardation plate is the s-polarized light. For this reason, to achieve the light intensity of the s-polarization component of 82% and the light intensity of the p-polarization component of 18%, the first retardation plate may be a quarter-wavelength plate. This is because the quarter-wavelength plate is capable of separately controlling the light incident thereon, by changing the arrangement angle of its optical axis, in the following manner. That is, when an s-polarized light enters, the s-polarization component can be controlled to have a light intensity ranging from 100% to a minimum of 50% while the p-polarization component can be controlled to have a light intensity ranging from 0% to a maximum of 50%.

The description has been made using the case where half-wavelength plates 30 and 31 and quarter-wavelength plate 39 are the thin-film retardation plates; however, these plates may be made of quartz which is expensive but offers excellent light resistance. Alternatively, these plates may be each a fine-structure retardation plate which functions utilizing birefringence achieved by a fine periodic structure that is smaller in periodic dimension than wavelengths of light.

As described above, the light source device according to the present disclosure is configured as follows. That is, light emitted by the plurality of the solid-state light source units are combined together by the polarization combination mirror. The polarization azimuth of one of polarized lights coming from the polarization combination mirror, is converted to produce a p-polarized light and an s-polarized light by mans of the third retardation plate that has a strip shape. Proportions of the p-polarized light and the s-polarized light are controlled by the first retardation plate. Then, the polarized lights enter the dichroic mirror that subjects the lights to polarization separation. Then, the light on one side produced through the polarization separation performed by the dichroic mirror is used to irradiate the phosphor plate so as to excite the phosphor to emit color light. The light on the other side produced through the polarization separation is subjected to polarization conversion performed by second retardation plate so as to produce blue light. Then, the color light and the blue light are efficiently condensed and combined together to generate white light. This allows the configuration of the light source device featuring a compact size and high luminance.

Second Exemplary Embodiment

Hereinafter, a second embodiment will be described with reference to FIG. 5. In the description, constituent elements having the same functions as those of the first embodiment are designated by the same numerals and symbols, and their explanations are sometimes omitted.

Figure 5:
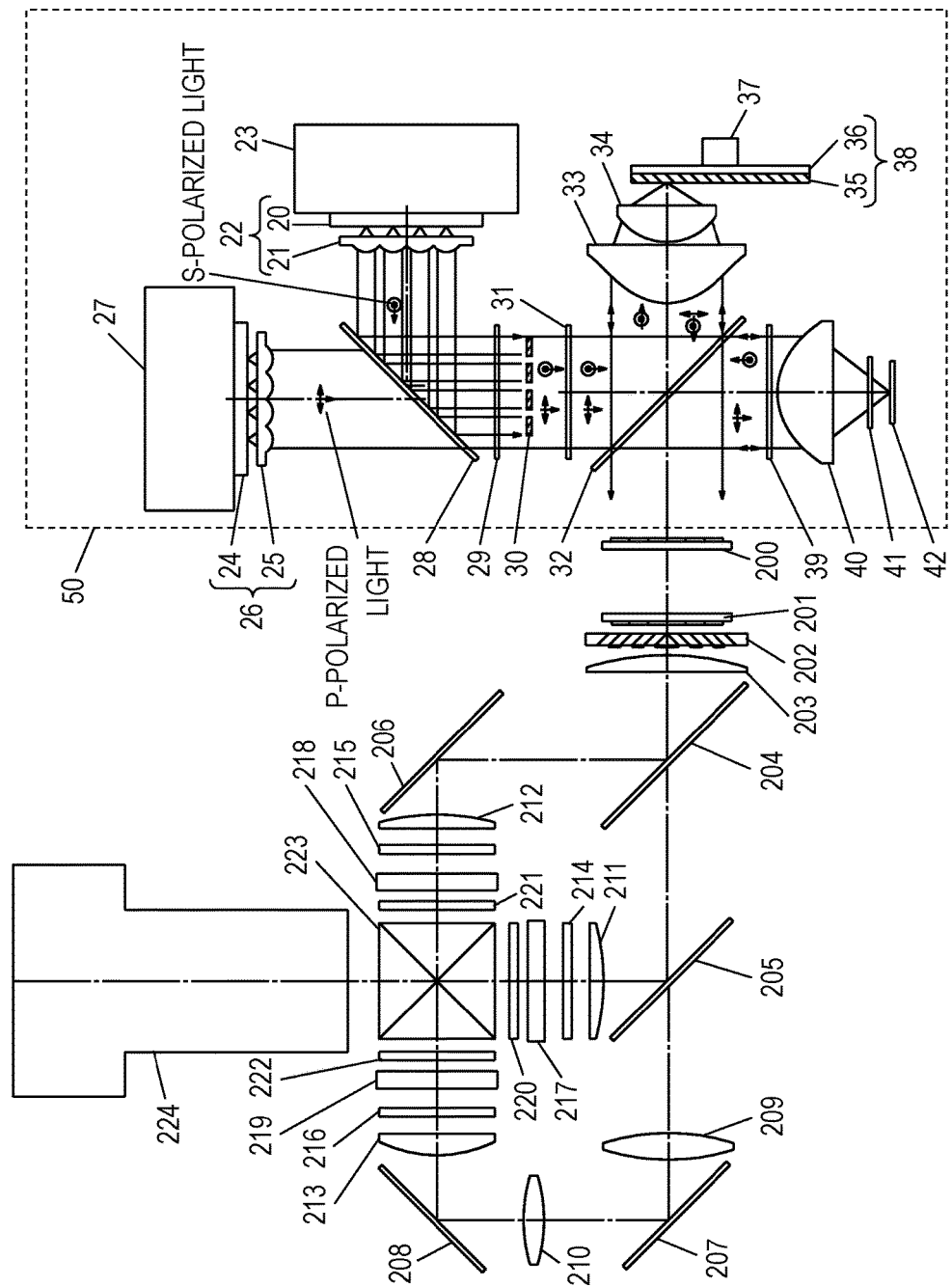
FIG. 5 is a view of a configuration of a projection display apparatus according to a second embodiment of the present disclosure.

FIG. 5 is a view of a projection display apparatus according to the second embodiment of the present disclosure. The device uses image forming elements to form images in accordance with an image signal. Each of the elements is an active-matrix transmissive liquid crystal panel, of either twisted nematic (TN) mode or vertical alignment (VA) mode, which is provided with thin-film transistors formed in its pixel region.

The projection display apparatus includes: first lens array plate 200, second lens array plate 201, polarization conversion element 202, superimposing lens 203, blue-reflection dichroic mirror 204, green-reflection dichroic mirror 205, reflection mirrors 206, 207, and 208, relay lenses 209 and 210, field lenses 211, 212, and 213, incidence-side polarizing plates 214, 215, and 216, liquid crystal panels 217, 218, and 219, exiting-side polarizing plates 220, 221, and 222, color combining prism 223 configured with a red-reflection dichroic mirror and a blue-reflection dichroic mirror, and projection lens 224.

White light coming from light source device 50 enters first lens array plate 200 that is configured with a plurality of lens elements. Luminous flux incident on first lens array plate 200 is divided into a large number of luminous fluxes. The large number of the divided luminous fluxes converge onto second lens array plate 201 that is configured with a plurality of lenses. The lens elements of first lens array plate 200 are similar in opening shape to liquid crystal panels 217, 218, and 219. The lens elements of second lens array plate 201 have a focal length which is determined such that first lens array plate 200 and liquid crystal panels 217, 218, and 219 are substantially in a conjugate relation. The light having exited from second lens array plate 201 enters polarization conversion element 202. Polarization conversion element 202 is configured with a polarization separating prism and a half-wavelength plate, thereby converting natural light coming from a light source into light polarized in one direction. The fluorescence, being natural light, is converted, through polarization conversion, into a polarized light in one direction. In contrast, the blue light incident on the polarization conversion element is an s-polarized light; therefore, its polarization is not converted. The light coming from polarization conversion element 202 enters superimposing lens 203.

Superimposing lens 203 is a lens intended to superimpose the light, which has exited from each of the lens elements of second lens array plate 201, onto liquid crystal panels 217, 218, and 219. First lens array plate 200, second lens array plate 201, polarization conversion element 202, and superimposing lens 203, configure an illumination optical system that condenses the light coming from the light source to illuminate a to-be-illuminated region.

The light coming from superimposing lens 203 is separated into color lights of blue, green, and red by blue-reflection dichroic mirror 204 and green-reflection dichroic mirror 205, with these mirrors being color separation means. The green color light passes through field lens 211 and incidence-side polarizing plate 214 to enter liquid crystal panel 217. The blue color light reflects off reflection mirror 206, passes through field lens 212 and incidence-side polarizing plate 215, and then enters liquid crystal panel 218. The red color light passes through relay lenses 209 and 210, and then reflects off reflection mirrors 207 and 208, respectively.

After having reflected-off, the light passes through field lens 213 and incidence-side polarizing plate 216 to enter liquid crystal panel 219.

Each of three liquid crystal panels 217, 218, and 219 changes the polarization state of the light incident thereon, by controlling the voltages applied to its pixels in accordance with an image signal. Then, the light exiting from these liquid crystal panels are modulated to form green, blue, and red images by means of combinations of incidence-side polarizing plates 214, 215, and 216 and exiting-side polarizing plates 220, 221, and 222, respectively. Each of the combinations is configured such that the corresponding incidence-side polarizing plate and the corresponding exiting-side polarizing plate are disposed respectively on both sides of the corresponding liquid crystal panel, with the transmission axes of the corresponding incidence-side and exiting-side polarizing plates being orthogonal to each other. The color lights having passed through exiting-side polarizing plate 220, 221, and 222 are combined together by color combining prism 223 as follows: The red and blue colors are reflected off the red-reflection dichroic mirror and the blue-reflection dichroic mirror, respectively. Then, the thus-reflected red color, the thus-reflected blue color, and the green color are combined together to enter projection lens 224, with the thus-combined light being a video light expressing the image that has been formed by the liquid crystal panels. Then, the light having entered projection lens 224 is enlarged and projected on a screen (not shown).

The light source device is configured with the plurality of the solid-state light source units to so as to have a compact size, and is capable of highly-efficiently emitting white light with an excellent white balance. Therefore, this can provide the light source device featuring long service life and high luminance. Moreover, the image forming means adopts not a time-sharing method but the method using the three liquid crystal panels that utilize polarization. This achieves a good color reproduction without color-breaking, resulting in the formation of projection images featuring high luminance and definition. Furthermore, the light source device has advantages over other devices using three DMD elements in that the device does not require any total reflection prism and that the color combining prism is a small-sized 45-degree-incidence prism, which thereby allows downsizing of the projection display apparatus.

As described above, the projection display apparatus according to the embodiment uses the light source device that is configured as follows. That is, light emitted by the plurality of the solid-state light source units are combined together by the polarization combination mirror. The polarization azimuth of one of polarized lights coming from the polarization combination mirror, is converted to produce a p-polarized light and an s-polarized light by means of the third retardation plate that has a strip shape. Proportions of the p-polarized light and the s-polarized light are controlled by the first retardation plate. Then, the polarized lights enter the dichroic mirror that subjects the lights to polarization separation. Then, the light on one side produced through the polarization separation performed by the dichroic mirror is used to irradiate the phosphor plate so as to excite the phosphor to emit color light. The light on the other side produced through the polarization separation is subjected to polarization conversion performed by second retardation plate so as to produce blue light. Then, the color light and the blue light are efficiently condensed and combined together to generate white light. This allows the configuration of the projection display apparatus featuring a compact size and high luminance.

Although the image forming means adopts the transmissive liquid crystal panels, the means may be configured with reflective liquid crystal panels. Use of the reflective liquid crystal panels allows the configuration of the projection display apparatus featuring a more compact size and higher definition.

Third Exemplary Embodiment

Hereinafter, a third embodiment will be described with reference to FIG. 6. In the description, constituent elements having the same functions as those of the first embodiment are designated by the same numerals and symbols, and their explanations are sometimes omitted.

Figure 6:
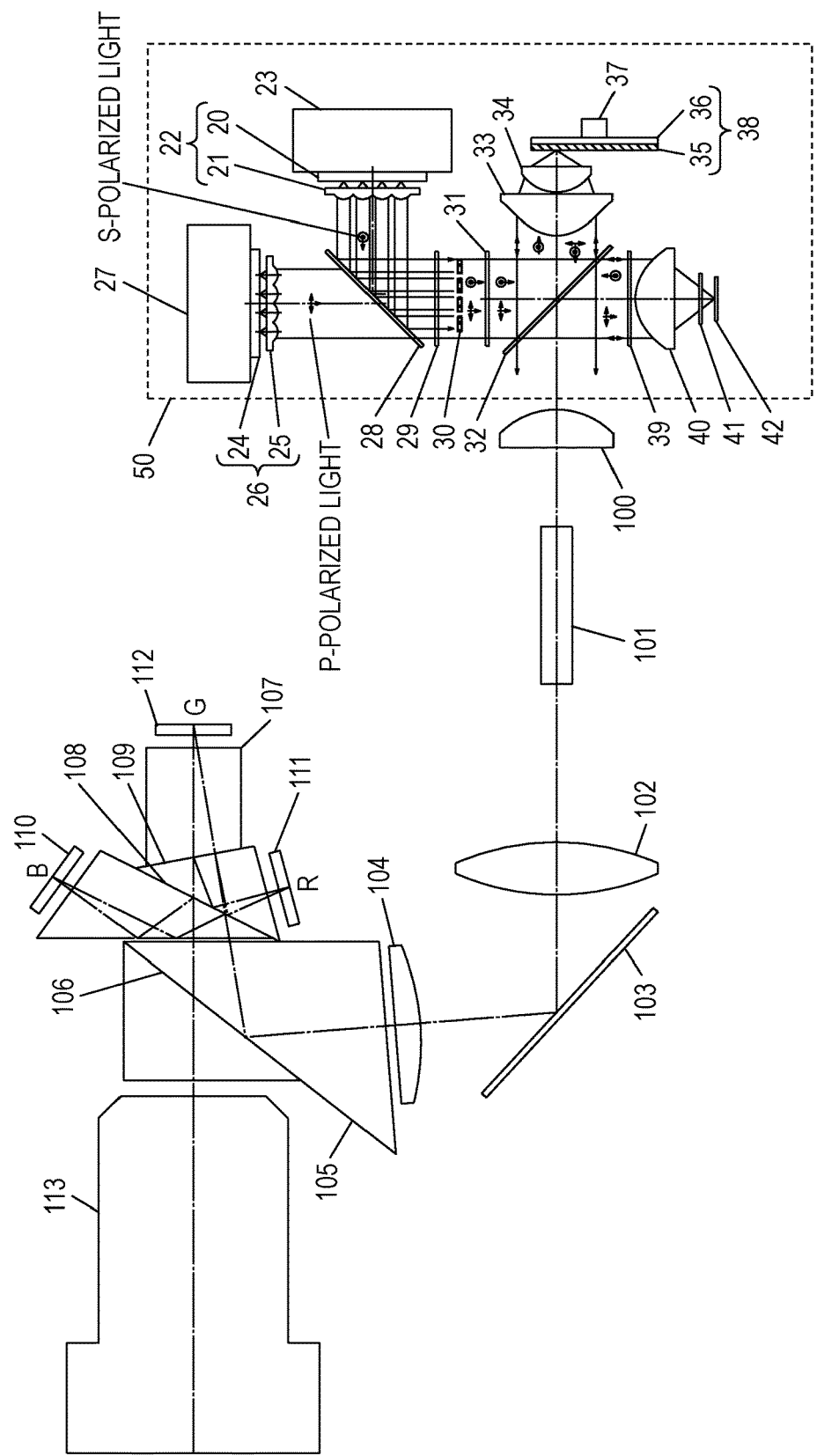
FIG. 6 is a view of a configuration of a projection display apparatus according to a third embodiment of the present disclosure.

FIG. 6 is a view of a projection display apparatus according to the third embodiment of the present disclosure. Three digital micromirror devices (DMDs) are used as image forming elements that form images in accordance with an image signal.

White light having exited from light source device 50 enters condensing lens 100 so as to be condensed on rod 101. The light having entered rod 101 reflects multiple times in the inside of the rod, which makes its light intensity distribution uniform, followed by being allowed to exit. The light having exited from rod 101 is condensed by relay lens 102, reflects off reflecting mirror 103, passes through field lens 104, and then enters total reflection prism 105. In this way, condensing lens 100, rod 101, relay lens 102, reflecting mirror 103, and field lens 104, configure an illumination optical system that condenses the light coming from the light source to illuminate a to-be-illuminated region.

Total reflection prism 105 is configured with two prisms with thin air layer 106 that is interposed between vicinal faces of the two. Air layer 106 entirely reflects light incident at angles not smaller than a critical angle of total reflection. The light incident from field lens 104 is reflected off the total-reflection face of total reflection prism 105 to enter color prism 107. Color prism 107 is configured with three prisms with vicinal faces between the three. Blue-reflection dichroic mirror 108 and red-reflection dichroic mirror 109 are each interposed between a corresponding pair of the vicinal faces. The light is separated into color lights of blue, red, and green by means of blue-reflection dichroic mirror 108 and red-reflection dichroic mirror 109 of color prism 107. Then the separated color lights of blue, red, and green enter DMDs 110, 111, and 112, respectively.

Each of DMDs 110, 111, and 112 deflects its micromirrors in accordance with an image signal, thereby reflecting the light as follows: That is, the light is partly reflected to enter projection lens 113 and partly reflected to travel toward the outside of the effective area of projection lens 113. The light having been reflected off each of DMDs 110, 111, and 112 passes through color prism 107 again. The blue, red, and green color lights, which have been once separated, are combined together in the course of passing through color prism 107, followed by entering total reflection prism 105. The light having entered total reflection prism 105 passes through air layer 106 because of its incident angle not larger than the critical angle of total reflection, then enters projection lens 113. Then, the light of image formed by DMDs 110, 111, and 112 in this way is enlarged and projected on a screen (not shown).

The light source device is configured with the plurality of the solid-state light sources, thereby allowing the highly-efficient emission of white light with an excellent white balance; therefore, this can provide the projection display apparatus featuring long service life and high luminance.

Moreover, the image forming means using the DMDs has advantages over other image forming means using liquid crystals in that it can configure the projection display apparatus with high resistance to light and heat. Furthermore, use of three pieces of DMDs results in the generation of projected images featuring excellent color reproduction, high luminance, and high definition.

As described above, the projection display apparatus according to the embodiment uses the light source device that is configured as follows. That is, light emitted by the plurality of the solid-state light source units are combined together by the polarization combination mirror. The polarization azimuth of one of polarized lights coming from the polarization combination mirror, is converted to produce a p-polarized light and an s-polarized light by means of the third retardation plate that has a strip shape. Proportions of the p-polarized light and the s-polarized light are controlled by the first retardation plate. Then, the polarized lights enter the dichroic mirror that subjects the lights to polarization separation. Then, the light on one side produced through the polarization separation performed by the dichroic mirror is used to irradiate the phosphor plate so as to excite the phosphor to emit color light. The light on the other side produced through the polarization separation is subjected to polarization conversion performed by second retardation plate so as to produce blue light. Then, the color light and the blue light are efficiently condensed and combined together to generate white light. This allows the configuration of the projection display apparatus featuring a compact size and high luminance.

The technology according to the present disclosure is applicable to light source devices using light sources in which phosphors are excited to emit light, and to projection apparatuses provided with the light source devices.

What is claimed is:

1. A light source device, comprising:
   a first solid-state light source unit including:
      a plurality of first solid-state light source elements disposed at a pitch "p," configured to emit a first linearly-polarized light; and
      a plurality of first lenses disposed on an emission side of the first solid-state light source elements, configured to cause the first linearly-polarized light to exit as a parallel light with a luminous flux width "d," wherein a condition d>p/2 is satisfied;
   a second solid-state light source unit including:
      a plurality of second solid-state light source elements disposed at the pitch "p," configured to emit a second linearly-polarized light orthogonal to the first linearly-polarized light; and
      a plurality of second lenses disposed on an emission side of the second solid-state light source elements, configured to cause the second linearly-polarized light to exit as a parallel light with the luminous flux width "d," wherein a condition d>p/2 is satisfied, the first linearly-polarized light exiting from the first lenses is orthogonal to the second linearly-polarized light exiting from the second lenses, and the second solid-state light source unit is disposed at a position displaced by p/2 relative to the first solid-state light source unit in a direction parallel to a polarization direction of the second linearly-polarized light;
   a polarization combination mirror configured to combine polarized lights exiting from the first solid-state light source unit and the second solid-state light source unit so as to combine luminous fluxes of the polarized lights;
   a first retardation plate configured to convert polarization states of the polarized lights coming from the polarization combination mirror;
   a dichroic mirror configured to reflect and pass the polarized lights coming from the first solid-state light source unit and the second solid-state light source unit based on type of polarization;
   a phosphor plate configured to be excited by polarized lights reflected by the dichroic mirror so as to emit fluorescence;
   a second retardation plate configured to convert polarized lights passed from the dichroic mirror to a circularly-polarized light;
   a reflecting plate configured to reflect the circularly-polarized light toward the second retardation plate, the circularly-polarized light having been converted by the second retardation plate; and
   a third retardation plate having a strip shape disposed between the polarization combination mirror and the dichroic mirror, the third retardation plate being disposed at a position such that light having passed through the third retardation plate becomes a mixed light, the mixed light including both the first linearly-polarized light and the second linearly-polarized light.

2. The light source device according to claim 1, wherein the first retardation plate is one of a half-wavelength plate and a quarter-wavelength plate.

3. The light source device according to claim 1, wherein the second retardation plate is a quarter-wavelength plate.

4. The light source device according to claim 1, wherein the third retardation plate is a half-wavelength plate.

5. The light source device according to claim 1, wherein each of the first to third retardation plates is a thin-film retardation plate utilizing birefringence of a film formed with a dielectric material by oblique deposition.

6. The light source device according to claim 1, wherein each of the first to third retardation plates is a fine-structure retardation plate utilizing birefringence achieved by a fine structure.

7. The light source device according to claim 1, wherein each of the first to third retardation plates is made of quartz.

8. The light source device according to claim 1, wherein the first retardation plate includes a rotation adjusting mechanism.

9. The light source device according to claim 1, wherein the plurality of the solid-state light sources is blue-light semiconductor lasers.

10. The light source device according to claim 1, wherein the lights exiting from the plurality of the solid-state light sources are linearly-polarized lights.

11. The light source device according to claim 1, wherein the phosphor plate includes:
   a rotation-controllable circular substrate, and
   a phosphor layer of a cerium (Ce)-activated yttrium-aluminum-garnet (YAG) yellow phosphor, the layer being disposed on the substrate.

12. The projection display apparatus according to claim 1, wherein both the first linearly-polarized light and the second linearly-polarized light are incident on the third retardation plate.

13. The projection display apparatus according to claim 1, wherein both light emitted from the plurality of first solid-state light source elements and light emitted from the plurality of second solid-state light source elements are incident on the third retardation plate.

14. A projection display apparatus, comprising:
   a light source device according to claim 1;

an illumination optical system for condensing light incident from the light source device so as to illuminate a to-be-illuminated region;

an image forming element for forming an image in accordance with an image signal; and a projection lens for enlarging and projecting the image formed by the image forming element.

15. The projection display apparatus according to claim 14, wherein the image forming element is a liquid crystal panel.

16. The projection display apparatus according to claim 14, wherein the image forming element is a mirror-deflection-type digital micromirror device (DMD).

* * * * *